No. 637,477. Patented Nov. 21, 1899.
W. H. NEWMAN.
VARIABLE SPEED GEAR.
(Application filed July 3, 1899.)

(No Model.) 2 Sheets—Sheet 1.

Witnesses. Inventor.
William Henry Newman

No. 637,477. Patented Nov. 21, 1899.
W. H. NEWMAN.
VARIABLE SPEED GEAR.
(Application filed July 3, 1899.)
(No Model.) 2 Sheets—Sheet 2.
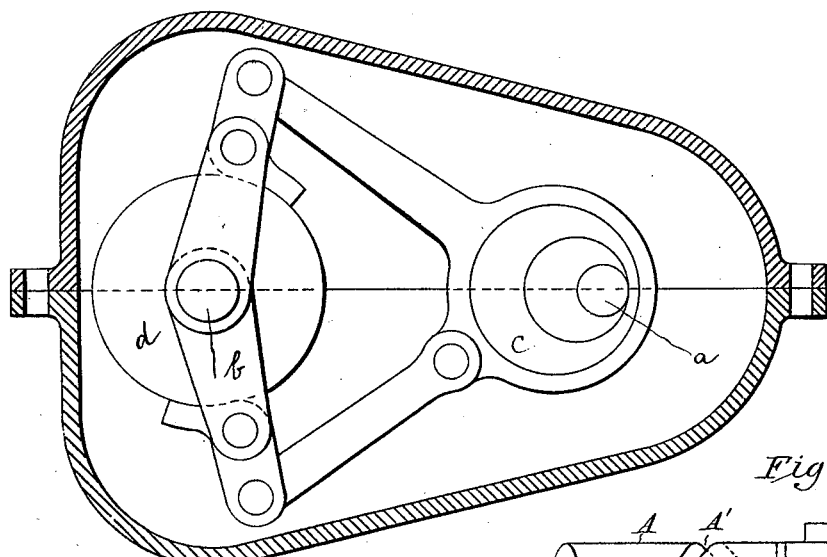
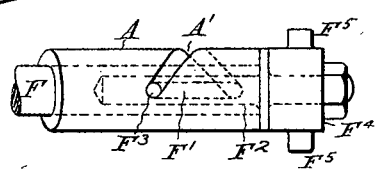
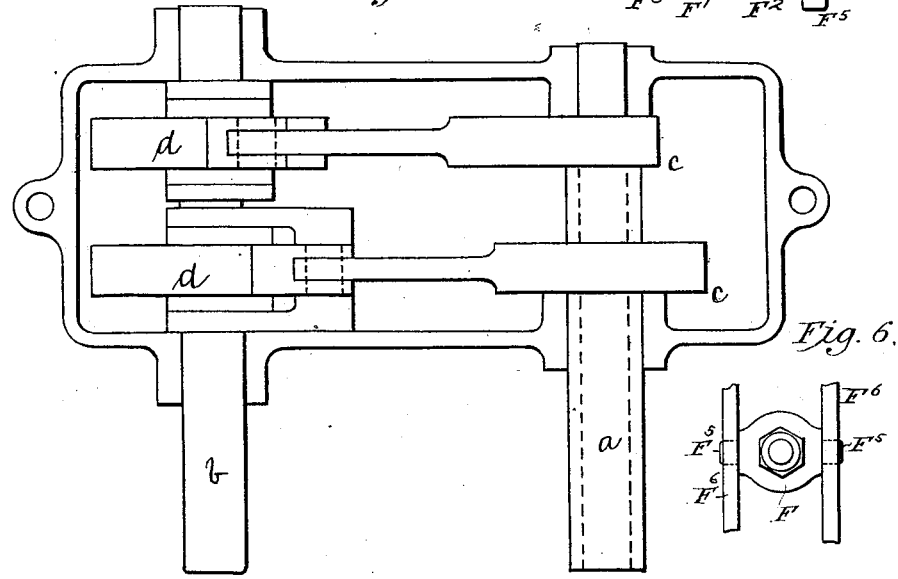
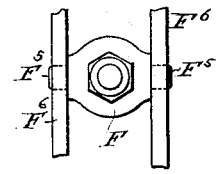
Witnesses.
Inventor:
William Henry Newman
By his Attorneys
Baldwin Davidson & Wight

UNITED STATES PATENT OFFICE.

WILLIAM HENRY NEWMAN, OF TOTTERIDGE PARK, ENGLAND.

VARIABLE-SPEED GEAR.

SPECIFICATION forming part of Letters Patent No. 637,477, dated November 21, 1899.

Application filed July 3, 1899. Serial No. 722,670. (No model.)

*To all whom it may concern:*

Be it known that I, WILLIAM HENRY NEWMAN, engineer, a subject of the Queen of Great Britain, residing at Totteridge Park, in the county of Herts, England, have invented certain new and useful Improvements in Variable-Speed Gear, of which the following is a specification.

According to this invention a shaft is driven by a number (generally three) of ratchet-wheels or the like, which are themselves intermittently and alternately driven by an oscillating arm or arms, the extent of the oscillations and therefore the speed of the driven shaft being varied at will.

Figure 1:
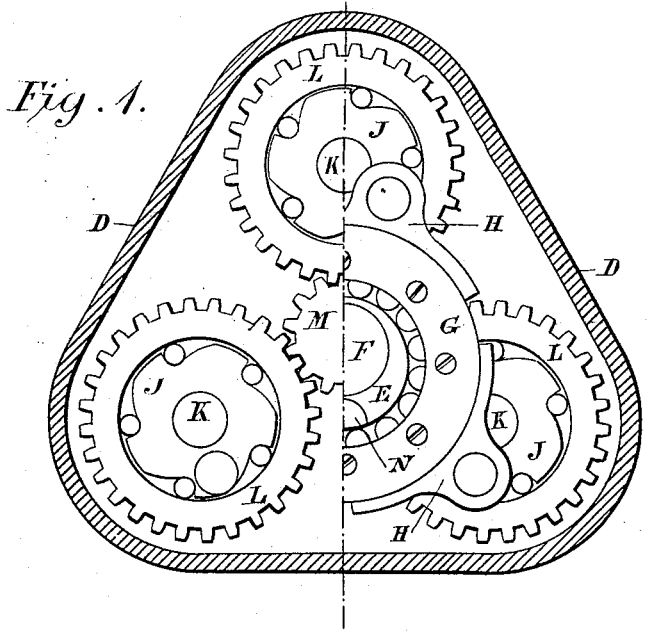
Figure 2:
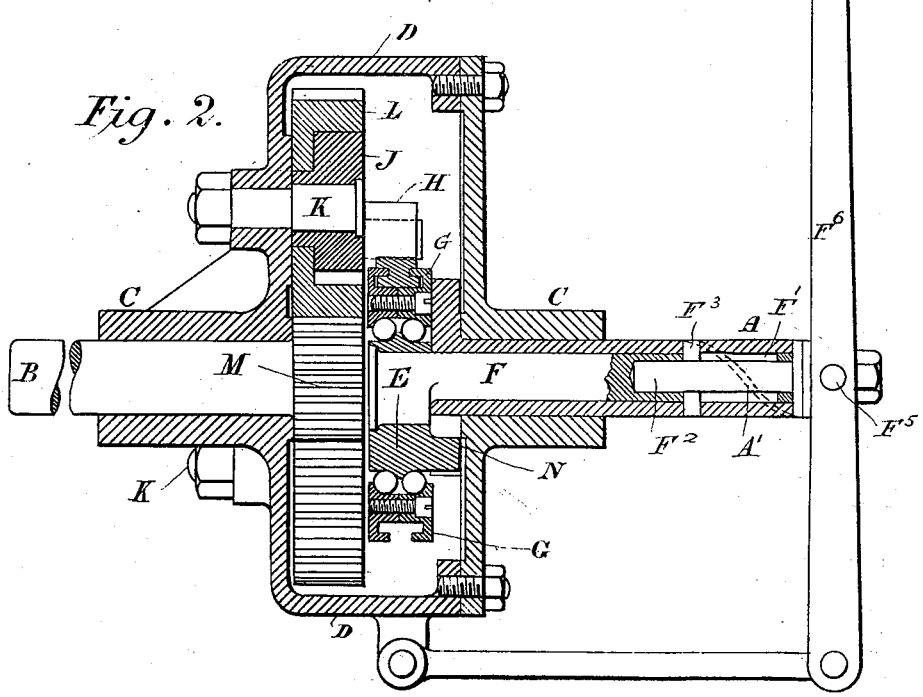

Figure 1 is a transverse section, and Fig. 2 a longitudinal section, showing one convenient means of carrying out this invention. Figs. 3 and 4 are similar views of a modification. Figs. 5 and 6 show certain details of construction.

A is the driving-shaft, which may be driven by the prime mover in any convenient manner.

B is the driven shaft, which is connected to the machinery of which the speed has to be varied.

The shafts A and B work in bearings C C, which are in the same straight line and which may be conveniently fixed in a frame or box D, which forms an oil-chamber for the mechanism to work in.

On the end of the driving-shaft A is fixed a variable crank or eccentric E. This may be conveniently made as shown. The shaft A is formed as a tube or sleeve and has working in it a smaller shaft F, on the end of which is formed a small eccentric. Surrounding this is the larger eccentric E, and by revolving the one eccentric inside the other by any suitable means the throw of the combined eccentric can be varied at will. The sleeve A drives the eccentric E by means of the pin N on E, which engages in a slot in a collar which is formed on the end of A. A convenient method of revolving the shaft F relatively to A and so altering the throw of the eccentric is that shown in Figs. 2, 5, and 6. A spiral slot A' is formed in the sleeve A and a straight slot F' in the shaft F, the end of which is made hollow and has a short rod $F^2$ sliding in it. This rod has a pin $F^3$ through it at right angles, which engages with both the spiral slot and the straight slot. The end of the rod $F^2$ is free to turn, but not to move endwise in a bush $F^4$, carrying trunnions $F^5$, free to turn in bearings in a hand-lever $F^6$. If the rod $F^2$ is moved in or out of F by means of the hand-lever $F^6$ or other convenient device, the sleeve A and shaft F revolve relatively to one another. Any other convenient method of altering the throw of the eccentric may be employed.

A ring G surrounds the eccentric E and preferably has between it and the eccentric a row of balls or rollers in order to reduce the friction. This ring has three blocks H H H, which can slide around the edge of the ring, but are retained in a circular path by the ring being of the section shown. The blocks H H H engage with pins or studs, which are part of the three ratchets or clutches J J J. These ratchets or clutches, which are formed as part of the three gear-wheels L L L and are preferably of the silent ratchet-and-pawl type, work on three studs K K K, which are fixed to the frame D. The three gear-wheels L L L all gear with the same pinion M, which is fixed to the shaft B and which they drive.

The action is as follows: When the eccentric has no radius or throw—*i. e.*, when its center coincides with that of the shaft A—it simply revolves within the ring G. If, however, it is given a small throw or radius, the blocks H H H, which engage with the clutches J J J, will reciprocate through a small distance and the clutches will revolve backward and forward through a small angle, turning on the studs K K K. The clutches will turn with them the gear-wheels L L L, but only in one direction, and as the clutches come into action alternately the shaft B will receive a continuous rotary motion.

If the throw of the eccentric is increased, the angle through which the gear-wheels turn will be increased, and therefore the speed of B will be increased, while reducing the throw will have the contrary effect. By this means the speed of B can be varied from zero to the maximum for which the mechanism is designed, the speed of A remaining constant.

The apparatus may also be arranged with the driving and driven shafts parallel to one another, instead of being in the same straight line. In this case the driving-shaft will have a number of variable cranks or eccentrics fixed on it, which will drive by means of rods or links a corresponding number of ratchets. The speed of rotation of the driven shaft will then be varied as before by varying the throw of the eccentrics. Fig. 3 is a transverse section, and Fig. 4 a longitudinal section, showing a convenient means of carrying out this arrangement. On the driving-shaft $a$ are fixed two variable eccentrics $c\ c$, whose centers are at right angles to one another. On the driven shaft $b$ are fixed two ratchet wheels or disks $d\ d$, each of which is driven by two ratchet-arms, which may be conveniently made in the form of nipping-levers—i.e., levers which nip and drive the wheel when moved in one direction, but immediately release it when moved in the opposite direction. Each eccentric is connected to the two ratchet-levers on the corresponding wheel on the driven shaft by two rods or links. It will be seen that this arrangement is equivalent to four eccentrics connected to single ratchets, as in a single revolution of an eccentric there are two driving-strokes of the corresponding ratchets. The whole mechanism may be conveniently arranged in a box as before, which forms supports for the various parts and also an oil-bath for them to work in.

A property of the apparatus which may be valuable in certain cases is that the driven shaft can turn perfectly freely in its direction of rotation without putting the driving-shaft in motion. Thus in the case of a vehicle running freely down a hill the driven shaft, which would be connected to the road-wheels, would turn at a corresponding speed, but it would not be necessary for the driving shaft or motor to be in motion at all. This property is due to the fact that the wheels which are driven by the ratchets are quite free to overrun the ratchets in one direction.

What I claim is—

1. The combination of a driving-shaft, a driven shaft, two or more clutches rotating the driven shaft in one direction, an eccentric on the driving-shaft, a second eccentric surrounding the first, a ring on the second eccentric, connections between the ring and the clutches, and means for rotating the two eccentrics relatively to each other.

2. The combination of a driving-shaft, a driven shaft, ratchet-wheels arranged at equal angles around the driven shaft, toothed wheels coaxial with the ratchet-wheels and driven by them in one direction by pawls, a toothed wheel fixed to the driven shaft and gearing with the other wheels, an eccentric on the driving-shaft, a second eccentric surrounding the first, a ring on the second eccentric, connections between the ring and the ratchet-wheels, and means for rotating the two eccentrics relatively to each other.

WILLIAM HENRY NEWMAN.

Witnesses:
WALTER J. SKERTEN,
T. J. OSMAN.